INVENTORS
ROBERT B. CLAY
GEORGE A. GOEPFRICH
BY Lindsey and Prutzman
ATTORNEYS

2,821,997
Patented Feb. 4, 1958

2,821,997

SOLENOID CONTROL VALVE

Robert B. Clay and George A. Goepfrich, New Britain, Conn., assignors to The Skinner Chuck Company, New Britain, Conn., a corporation of Connecticut Application March 15, 1954, Serial No. 416,279

7 Claims. (Cl. 137—623)

The present invention relates to solenoid-actuated fluid flow control valves.

A principal object of the invention is to provide a solenoid valve for controlling fluid flow which is extremely flexible and adaptable for connection in a wide variety of ways, and hence has sufficient versatility to be capable of universal application in many different flow control systems.

Another object is to provide a solenoid valve of the character described which is particularly arranged for interchangeability and reversal of disposition of certain parts therein, thereby further enhancing the flexibility of the valve and increasing its adaptability for connection in a wide variety of different ways.

Another object is to provide a solenoid valve having a plurality of solenoids and a plurality of valving members, yet so arranged as to provide a rugged and durable structure of exceptional compactness.

Another object is to provide a valve which is simple to assemble and disassemble, and hence is particularly suited to assembly during manufacture, and to disassembly for cleaning and the like, by relatively unskilled personnel.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 1:
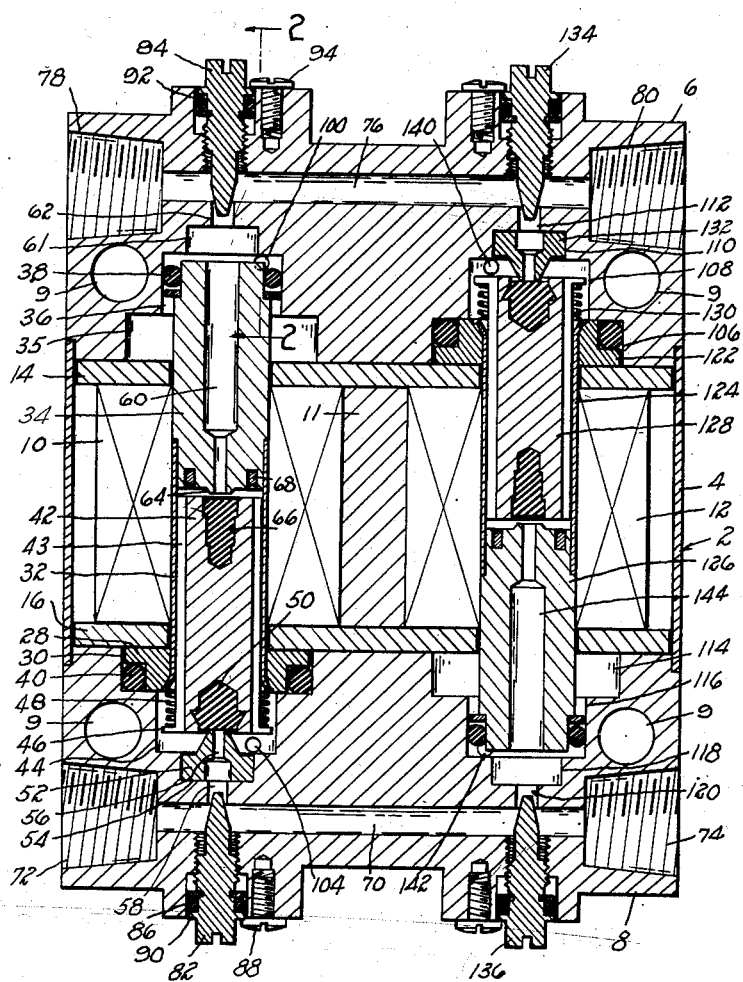
Fig. 1 is a sectional view of a solenoid valve assembly constructed in accordance with the present invention.

Referring to the drawings, and particularly Fig. 1 thereof, a solenoid valve constructed in accordance with the present invention includes a valve body 2 which consists of a hollow casing 4 of somewhat flattened cylindrical shape, preferably made of magnetic material, and closed at its top and bottom ends by respective top and bottom caps 6, 8. The top and bottom caps are identical in shape, and are provided with mounting holes 9 to receive bolts for mounting the valve body.

Within the casing 4, disposed in side-by-side spaced relation, are two electromagnetic coils 10, 12 of generally cylindrical shape which develop electromagnetic fields for operating the valve assembly. Adjacent the inside surfaces of the top and bottom caps 6, 8 are disposed top and bottom transverse flux plates 14, 16 of magnetic material which, together with the casing 4, provide a continuous external flux path for the electromagnetic coils 10, 12. Between flux plates 14, 16 and intermediate coils 10, 12 are spacers 11 which prevent distortion of the parts when the valve is assembled. In one wall of the casing is provided an aperture having a neck 20 through which extends a pair of lead wires 22, 24 for each of the coils.

The top and bottom caps 6, 8 are each symmetrically bored out at each side thereof in alignment with the axis of each coil to receive respective sleeve assemblies containing the movable parts of the valve, whose positions are controlled by the coils 10, 12. The sleeve assembly associated with coil 10 includes a flange 28 which is received within a recess 30 counterbored in the inner surface of the bottom cap 8, coaxial with coil 10. Within flange 28 is secured, as by welding, the lower end of a non-magnetic sleeve member 32. At its upper end the sleeve member 32 is connected to a stop or plug 34, preferably of magnetic material. Stop 34 in turn extends through a recess 35 counterbored in top cap 6 symmetrical with recess 30 in bottom cap 8. The top end of the stop 34 is supported in a recess 36 further counterbored in the top cap 6. The top end of stop 34 is provided with a fluid-tight seal to the top cap 6 by means of packing 38, and a similar packing 40 is likewise provided to seal the connection between the flange 28 and the bottom cap 8.

Within the sleeve 32 is supported a reciprocable armature or plunger 42 of magnetic material having longitudinal grooves or slots 43 in its outer surface which serve as a fluid connection between the top and bottom of the plunger. The lower end of plunger 42 extends into a recess 44 further axially counterbored in bottom cap 8 adjacent recess 30. This end of plunger 42 has an external flange 46 between which and the end of the sleeve 32 a spring 48 is arranged to bias the plunger 42 in a downward direction. The plunger has a valve plug 50 of resilient material inserted in its lower end, which is adapted to seat against a valve seat insert 52 oppositely disposed in a further axial recess 54 adjacent recess 44 in bottom cap 8.

Valve seat 52 is provided with a central aperture 56 which connects at its lower end with a passage 58 in bottom cap 8, also coaxial with coil 10. The stop 34 is axially bored out to rovide a passage 60 communicating with recess 36 in the top cap 6. Recess 36 in turn is connected by a further axially counterbored recess 61 to an axial passage 62 in the top cap. Stop 34 is of such a length that its top end is spaced somewhat from recess 61, and thus avoids isolating recess 36 from recess 61. Recesses 36 and 61 and passage 62 are arranged to be symmetrical with recesses 44 and 54 and passage 58 in the bottom cap. At the lower end of passage 60 the stop 34 is provided with an upraised lip 64 against which is adapted to seat a valve plug 66 of resilient material carried in the top end of plunger 42. The usual copper shading ring 68 is provided in the bottom end of stop 34 in valves operating with alternating current to prevent chattering of plunger 42 when the coil 10 is energized.

Within the bottom cap 8 is a lateral throughbore 70 which intersects passage 58 and is provided at each of its ends with counterbores forming connecting ports 72, 74 for the valve assembly. A similar lateral throughbore 76, intersecting passage 62 and counterbored at its ends to form ports 78, 80, is provided in top cap 6. The several ports 72, 74, 78, 80 are threaded, so that each may receive an external connection, or be plugged up when the valve is connected in such a way as not to require its use.

Opposite the outer ends of axial passages 58, 62 the top and bottom caps are further bored out to receive adjustable metering needle valves 82, 84, which are threaded for axial adjustment to meter the flow between lateral passage 70 and axial passage 58, and between lateral passage 76 and passage 62, respectively. Optionally either or both metering valves may be eliminated and replaced with plugs, and as a further option either or both of the bores for receiving the needle valves may be omitted. Metering valves 82 and 84 are preferably made long enough to shut off flow through passages 58 or 62 completely, if desired. A packing 86 is provided to seal the outer end of the metering valve 82 against leakage, and valve 82 is retained against accidental removal or bursting from bottom cap 6 by a capscrew 88, the head of which engages a flange 90 on metering valve 82. Valve 84 is similarly sealed and retained by packing ring 92 and capscrew 94.

Figure 2:
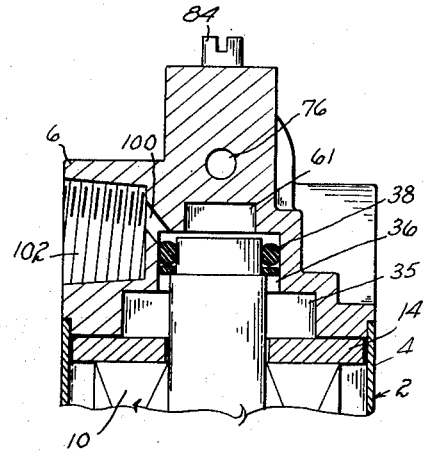
Fig. 2 is a sectional view of a portion of the solenoid shown in Figure 1 taken on the line 2—2 thereof.
Figure 3:
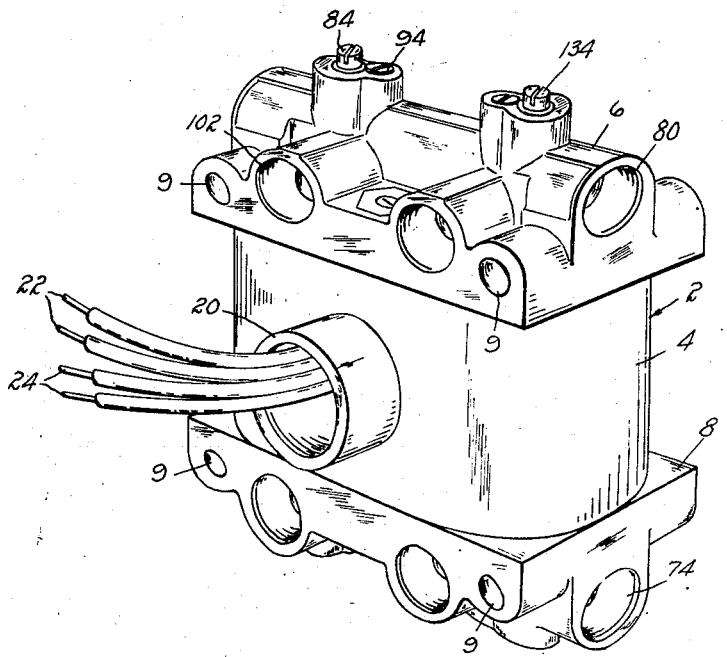
Fig. 3 is a perspective view of the valve assembly of the present invention.

The top cap 6 is also provided with a side outlet 100 communicating with recess 36 and counterbored at its outer end 102 to provide another connection for the valve assembly. The arrangement of this output 100 is shown in Fig. 2 of the drawings, which illustrates in detail how side outlet 100 connects to recess 36 adjacent the top end of stop 34. The bottom cap is provided with a similar side outlet 104 which connects in a similar manner with the recess 44 adjacent valve seat 52.

The top and bottom caps 6, 8 of valve body 2 are similarly symmetrically bored out in axial alignment with coil 12 to form in top cap 6 recesses, 106, 108 and 110, and axial passage 112 connecting to lateral passage 76, and to form in bottom cap 8 corresponding symmetrical recesses 114, 116 and 118, and axial passage 120 connecting to lateral passage 70. In these recesses are received a set of parts which are similar in all respects to those above described in connection with coil 10, and hence, for economy of description and to avoid repetition, will not be described in detail. These parts include a sleeve assembly comprising a flange 122, non-magnetic sleeve 124, stop 126, plunger 128, spring 130, and valve seat insert 132. To particularly illustrate the flexibility of the valve, however, and to show the suitability of its construction to arrangement of its internal parts in different ways, the parts associated with coil 12 are depicted in Fig. 1 in an inverted disposition relative to the like parts associated with coil 10.

The top and bottom caps are bored out opposite passages 112 and 120 to receive metering valves 134 and 136, which are identical with valves 82 and 84, and may likewise optionally be omitted or replaced with plugs.

A side outlet 140 communicates with recess 108 in top cap 6 in the same manner in which side outlet 100 connects to recess 36, and a similar side outlet 142 communicates with the recess 116 in bottom cap 6 adjacent the lower end of the bore 144 in stop 126 to complete the structure of the valve assembly.

In the operation of the valve with the coils de-energized, it will be apparent that in the "normal" condition of the valve, i. e. with the coils 10, 12 unenergized, the springs 48, 130 will keep the plungers 42, 128 in the positions shown in Fig. 1. In this position of plunger 42, it will be apparent that recess 44, and with it side outlet 104, is normally closed off from passage 58 and port 72. Recess 44 and side outlet 104 will, however, by reason of the spacing between plug 66 and lip 64, normally be connected with the bore in stop 34 and thence through recess 36, recess 61, and passage 62 to lateral passage 76 and ports 78 or 80. On the other hand, when the coil 10 is energized, the plunger 42 will be lifted to unseat valve plug 50 from valve seat insert 52, which connects recess 44 and side outlet 104 to port 72 or port 74, and closes valve plug 66 against lip 64 to disconnect recess 44 and side outlet 104 from ports 78 or 80.

Thus that portion of the valve associated with coil 10 constitutes a bi-positional control valve by means of which recess 44 and side outlet 104 can be connected alternatively to ports 78 and 80 or to ports 72 and 74. In one exemplary use of this portion of the valve, ports 72 and 78 might be connected respectively to pressure and exhaust lines in a fluid system, and side outlet 104 connected to a working cylinder, and thus the energization or de-energization of coil 10 would control the fluid pressure at outlet 104, and in turn at the working cylinder. With such an arrangement, of course, side outlet 100 would not be in use, and would therefore be plugged up to preserve the fluid tightness of the valve.

If it should be desired to provide a normally open connection from port 72 to one of the side outlets associated with coil 10, it is merely necessary to invert the disposition of the sleeve assembly associated with coil 10 from that shown in Fig. 1, which would place plunger 42 and valve seat 52 in the top cap adjacent port 78. Then port 72 would be normally connected through passage 58, the bore in stop 34, and the slots in plunger 42, to recess 36, recesses 54 and 44, and side outlet 100, so that outlet 100 would not be closed off from the pressure at port 72 until the coil 10 is energized. Likewise port 78 would normally be disconnected from outlet 100. With this arrangement, of course, side outlet 104 becomes inactive, and would be plugged.

Likewise when coil 12 is unenergized, recess 108 and side outlet 140 are disconnected from port 80 and connected to port 74 through the bore in stop 126, and when the coil 12 is energized, recess 108 and side outlet 140 are connected to port 80 and disconnected from port 74. Side outlet 142 would be inactive and plugged. With a reversal of the disposition of the parts associated with coil 12, port 80 would normally be connected to side outlet 142, and port 74 normally disconnected from side outlet 142. Likewise side outlet 140 would be plugged.

Accordingly, it will be apparent that, by reason of the many different fluid flow paths provided in the valve, the valve is particularly suited for connection in flow control systems in a wide variety of ways and the different valving actions obtainable as the coils 10 and 12 are energized or de-energized permit the valve to operate in an extremely versatile manner. Each coil and associated plunger can, of course, be operated independently, or, if desired, fluid can be directed from one side of the valve assembly to the other through the lateral passages 70, 76 or through interconnection of side outlets 100, 104 with side outlets 140 or 142.

Moreover, it will be apparent that, since the various recesses counterbored in the top cap are symmetrical with corresponding recesses in the bottom cap, the sleeve assembly including the plunger and valve seat associated with either coil can be inverted in the manner in which the parts associated with coil 12 are inverted relative to the parts associated with coil 10. Such a reversal in the disposition of a sleeve assembly and plunger will reverse its operation relative to the ports in the top and bottom cap, as previously described, and this feature thus provides further variations in the manner in which the valve may be connected into a fluid system.

Additionally, the metering valves are arranged in the valve body so that any or all may be eliminated as desired and the openings thus made in the top and bottom caps sealed with plugs. This further increases the flexibility and versatility of the valve, and increases its adaptability to a variety of installations.

Thus the arrangement above described provides a solenoid-actuated fluid control valve which is sufficiently versatile to be capable of application in a wide variety of installations involving many different fluid control problems. As a result of its exceptional flexibility, the valve is adapted for substantially universal application in various flow control situations, and from a manufacturing standpoint is thus suitable as a production item. Moreover, the arrangement of the symmetrical counterbores and the reversability of the sleeve and plunger associated with each solenoid coil, together with the arrangement of the top and bottom caps in closing arrangement with the top and bottom ends of the casing, permits the entire assembly to be readily assembled during manufacture, and readily disassembled for cleaning and repair, by comparatively unskilled personnel.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim:

1. A solenoid valve assembly comprising a casing, a pair of solenoid coils in said casing disposed in side-by-side relation, a removable and reversible sleeve assembly in each coil including a sleeve closed at one end by a pole piece and a reciprocable armature received in the other end of the sleeve, the pole piece and armature each being provided with a fluid flow passage extending therethrough and longitudinally of the sleeve, interchangeable top and bottom caps closing the end of the casing and having longitudinal fluid flow passages adapted to connect with the outer ends of the pole piece and armature fluid passages, said armature fluid passages being offset laterally of and from the pole piece fluid passages and longitudinal passages, the armatures being engageable with the pole pieces in response to energizing of the coils to prevent fluid flow connection between the inner ends of the armature and pole piece fluid passages, the armatures being engageable with the caps in response to de-energizing of the coils to prevent fluid flow connection between the outer ends of said armature passages and the associated longitudinal passages, each cap being provided with a lateral fluid flow passage connecting the longitudinal passages therein, external ports on said caps connected to said outer ends of said armature passages, and additional external ports on said caps connected to said longitudinal passages.

2. A solenoid valve assembly comprising a casing, a pair of solenoid coils in said casing disposed in side-by-side relation, a reversible sleeve assembly in each coil including a bi-positional armature axially reciprocal responsive to energization thereof and a pole piece having a bore adapted to be closed by said armature in one position thereof, longitudinal slots in said armatures connecting opposite ends thereof, identical and interchangeable top and bottom caps closing the ends of said casing and having longitudinal passages adapted to connect with said pole piece bores and said armature slots, valve seats in the longitudinal passages connected to said armature slots and valves on said armatures adapted to seat thereon to close off said longitudinal passages from said armature slots when said solenoid coils are deenergized, a lateral passage in each cap interconnecting the longitudinal passages therein, external connections for said longitudinal passages, and side outlets in said top and bottom caps permanently connected to said armature slots.

3. A solenoid valve assembly comprising a casing open at its ends, a pair of electromagnetic coils disposed in side-by-side relation in said casing, a reversible solenoid sleeve assembly for each coil including a longitudinally bored pole piece and a longitudinally slotted reciprocable plunger adapted to close the pole piece bore responsive to energizing of said coil, interchangeable top and bottom cap members closing the ends of said casing, identical recesses in said cap members for supporting said sleeve assemblies, whereby either sleeve assembly may be turned end-for-end to vary the operation of said valve assembly, said recesses connecting to the slots of adjacent plungers and bores of adjacent pole pieces, first identical passages in said cap members connected to said recesses, external ports for said first passages forming a first set of valve assembly connections, valves on said plungers adapted to close off said first passages adjacent thereto when said solenoids are de-energized, second identical passages in said cap members permanently connected to said recesses, external ports for said second passages forming a second set of connections for said valve assembly, and a lateral passage in each of said caps interconnecting the first passages therein to permit connection of said plunger valves in series.

4. A solenoid valve assembly comprising a casing open at its ends, a pair of electromagnetic coils disposed in side-by-side relation in said casing, a solenoid assembly for each coil and including a pole piece having an axial throughbore and a non-magnetic sleeve extending therefrom, a plunger reciprocable in said sleeve between a first position spaced from said pole piece and a second position closing said bore responsive to energizing of said coil, longitudinal flow passages in said plunger connecting opposite ends thereof, and a valve in the outer end of said plunger, a valve seat for each of said plunger valves, identical cap members closing the opposite ends of said casing, recesses in said cap members for supporting said solenoid assemblies, each of said recesses comprising in axially aligned connected relation a first portion adapted to receive one of said valve seats, a second portion adapted to receive the end of one of said pole pieces, and a third portion adapted to receive the outer end of one of said sleeves, whereby said sleeve assemblies and valve seats may be inverted end for end to vary the operation of said valve, longitudinal bores in each cap member connected to the recesses therein, an external connection for each of said longitudinal bores, and side outlets in said cap members connected to the second portions of said recesses and having ports at their outer ends forming additional connections for said valve.

5. A solenoid valve assembly comprising a casing open at its ends, a pair of electromagnetic coils disposed in side-by-side relation in said casing, a solenoid sleeve assembly disposed within each coil and including a pole piece having an axial throughbore and a non-magnetic sleeve extending therefrom, a plunger reciprocable in said sleeve between a first position spaced from said pole piece and a second position closing said bore responsive to energizing of said coil, longitudinal flow passages in said plunger connecting opposite ends thereof, and a valve in the outer end of said plunger, a valve seat for each of said plunger valves, top and bottom cap members closing the ends of said casing, recesses in said cap members for supporting said sleeve assemblies, each of said recesses comprising in axially aligned adjacent relation a first portion adapted to receive one of said valve seats, a second portion adapted to receive the outer end of one of said pole pieces, and a third portion adapted to receive the outer end of one of said sleeves, whereby said sleeve assemblies and valve seats may be inverted end for end to vary the operation of said valve, longitudinal bores in each cap member connected to the recesses therein, a lateral throughbore in each cap member intersecting said longitudinal bores, ports at the ends of said lateral throughbores forming connections for said valve, and side outlets in said cap members connected to said recesses and having ports at their outer ends forming additional connections for said valve.

6. A solenoid valve assembly comprising a casing open at its ends, a pair of electromagnetic coils disposed in side-by-side relation in said casing, a solenoid sleeve assembly disposed within each coil and including a pole piece having an axial throughbore and a non-magnetic sleeve extending therefrom, a plunger reciprocable in said sleeve responsive to energizing of said coil between a first position spaced from said pole piece and a second position closing said bore, longitudinal flow passages in said plunger connecting opposite ends thereof, and a valve in the outer end of said plunger, top and bottom cap members closing the ends of said casing, longitudinal bores in each cap member aligned with the axes of said coils, a lateral throughbore in each cap member intersecting said longitudinal bores, ports at the ends of said lateral throughbores forming connections for said valve, metering valves in the outer ends of said longitudinal bores and longitudinally adjustable to vary the orifice areas between said longitudinal bores and said lateral throughbores, valve seats for said plunger valves, recesses in said top and bottom cap members at the inner ends of said longitudinal bores adapted to receive and support opposite ends of said solenoid sleeve assemblies and to receive and support said interchangeable valve seats, whereby each of said solenoid sleeve assemblies and its associated valve seat may be turned end for end as desired to vary the operation of said valve, and side outlets in said cap members connected to said recesses and having ports at their outer ends forming additional connections for said valve.

7. A duplex solenoid valve assembly comprising a casing open at its ends, a pair of electromagnetic coils disposed in side-by-side relation in said casing, flux plates for said coils laterally disposed at opposite ends thereof, a solenoid sleeve assembly axially disposed in each coil and including a pole piece having an axial throughbore and a non-magnetic sleeve extending therefrom, a plunger reciprocable in said sleeve responsive to energizing of said coil between a first position spaced from said pole piece and a second position closing said bore, longitudinal flow passages in said plunger connecting opposite ends thereof, a spring biasing said plunger to said first position, and a valve in the outer end of said plunger, interchangeable identical top and bottom cap members closing the ends of said casing, longitudinal bores in each cap member aligned with the axes of said coils, a lateral throughbore in each cap member intersecting said longitudinal bores, ports at the ends of said lateral throughbores forming connections for said valve, metering valves in the outer ends of said longitudinal bores and longitudinally adjustable to vary the orifice areas between said longitudinal bores and said lateral throughbores, identical interchangeable valve seats for said plunger valves, identical recesses in said top and bottom cap members at the inner ends of said longitudinal bores adapted to receive and support opposite ends of said solenoid sleeve assemblies and to receive and support said interchangeable valve seats, whereby each solenoid sleeve assembly and valve seat may be turned end for end as desired to vary the operation of said valve assembly responsive to energizing of said solenoids, and side outlets in said cap members connected to said recesses and having ports at their outer ends forming additional connections for said valve assembly.

References Cited in the file of this patent

UNITED STATES PATENTS

| | | |
|---|---|---|
| 2,200,824 | Herman | May 14, 1940 |
| 2,595,311 | Strange | May 6, 1952 |
| 2,607,368 | Mayer | Aug. 19, 1952 |
| 2,614,584 | Goepfrich | Oct. 21, 1952 |
| 2,616,452 | Clay et al. | Nov. 4, 1952 |
| 2,686,535 | Le Tourneau | Aug. 17, 1954 |